(12) United States Patent
Schaub et al.

(10) Patent No.: US 6,353,469 B1
(45) Date of Patent: Mar. 5, 2002

(54) PHOTOGRAPHIC IMAGE ACQUISITION DEVICE

(75) Inventors: Heinrich Schaub, Wettingen; Willy Koch, Otelfingen, both of (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 09/624,773

(22) Filed: Jul. 25, 2000

(30) Foreign Application Priority Data

Jul. 27, 1999 (EP) .............................. 99114235

(51) Int. Cl.[7] .................. G03B 27/00; G03B 27/80; G03B 27/52; G03B 27/62; G03G 17/04
(52) U.S. Cl. ..................... 355/18; 355/38; 355/40; 355/75; 399/131
(58) Field of Search ................. 355/18, 38, 40, 355/75; 399/131

(56) References Cited

U.S. PATENT DOCUMENTS

| | | | |
|---|---|---|---|
| 4,555,632 A | | 11/1985 | Vockenhuber ............... 250/560 |
| 5,041,995 A | * | 8/1991 | Tokuda ........................ 364/525 |
| 5,162,842 A | * | 11/1992 | Shiota .......................... 355/40 |
| 5,841,518 A | * | 11/1998 | Kajiwara ...................... 355/40 |
| 5,917,578 A | * | 6/1999 | Nakamura .................... 355/32 |

FOREIGN PATENT DOCUMENTS

| | | |
|---|---|---|
| DE | 26 40 453 A1 | 3/1977 |
| EP | 0 515 428 B1 | 12/1992 |
| JP | 60-149039 | 8/1985 |

* cited by examiner

Primary Examiner—Russell Adams
Assistant Examiner—Khaled Brown
(74) Attorney, Agent, or Firm—Burns, Doane, Swecker & Mathis, LLP

(57) ABSTRACT

The photoelectric scanning device for original images contained on a photographic film has a film platform for the film, for temporarily holding the original images contained on the film in a respectively defined scanning position; a light source for illuminating the respective original image in the scanning position; a photoelectric converter for receiving light being transmitted through the respective original image in the scanning position, and for converting the received light into electrical scanning signals in a two-dimensional and pixel-by-pixel manner; an optical member for imaging the respective original image in the scanning position onto the photoelectric converter; and an electronic member for controlling the photoelectric converter and for reading out the electrical scanning signals which are generated by said photoelectric converter. A film notching device is disposed at the film platform in the region of the scanning position for punching or stamping a positioning notch into the side margin of the film at a location associated with the original image respectively in the scanning position. The integration of the film notching device directly into the scanning device requires only one positioning process of the films or the images contained on the films. Thus, the required apparatus cost and the technical control needed for the positioning are substantially reduced when compared to separate scanning and notching devices. Furthermore, the scanning device thus requires substantially less room than two separate devices, which is particularly significant when arranging the device within a copier device.

2 Claims, 4 Drawing Sheets

PHOTOGRAPHIC IMAGE ACQUISITION DEVICE

This application claims priority under 35 U.S.C. §§119 and/or 365 to 99 114 235.7 filed in Europe on Jul. 27, 1999; the entire content of which is hereby incorporated by reference.

1. Field of the Invention

The invention relates to a photographic image acquisition device.

2. Background of the Invention

The invention relates to a photographic image acquisition device for photographic original images contained on a photographic medium.

Examples of photographic image acquisition devices are photographic copiers and photoelectric scanning devices. Photographic copiers (also referred to as "printers") copy or acquire the image carried on a photographic medium (e.g. film) by means of a detecting member, such as a photoelectric converter (photosensitive photographic paper). A photoelectric scanning device scans the photographic medium (e.g. film or photograph) and uses, as a detecting member, typically a photoelectric converting member such as a CCD. In order to simplify the understanding of the present invention, the following description refers to a photoelectric scanning device. However the disclosed features are also applicable to any other kind of photographic image acquisition device.

When producing photographic copies in modern copy devices, the copy originals the original images (so-called frames) contained on a developed photographic film—are generally photoelectrically scanned in a pixel-by-pixel manner. The scanned values, thus obtained, are then evaluated for the actual copying process, in particular also for the control of the exposure. With the increasingly growing digital image production, originals are also photoelectrically scanned in a pixel-by-pixel manner having a very high resolution, wherein the scanned values represent all of the image information and are used for the photographic or print-technical recording on a carrier medium. During the scanning process, the film that contains the images to be scanned moves along a path through the scanning device, wherein each of the images is held in a scanning position and scanned in this position.

A requirement for the correct positioning of the images to be scanned is the knowledge of the local positions of the images on the film. In film types which do not have any information about the position of the images themselves, for example the well-known 135-films, the positions of the images (frames) on the film (e.g. relative to the beginning of the film or a section thereof) are determined by means of a separate image position detector (frame detector) based on photoelectric scanning, and the location information thus obtained, is transmitted to the film transport and positioning device in the scanning device. This can be carried out, for example, as described in detail in U.S. Pat. No. 5,285,235, the disclosure of which is hereby incorporated by reference in its entirety.

Furthermore, as it is commonly known that films themselves have no information about the location of the images contained thereon, the providing of notches in their side margin sections that have a defined local correlation to the individual images (frames) on the film is a common practice in photo finishing. These notches can then be used in other processing stages for the positioning of the image locations. Image location detectors based on photoelectric scanning are also used for the positioning of the film in the notching device. They are either a component of the notching device or are arranged again in a separate device, wherein the location information is then transmitted to the film transport and positioning device in the notching device, which can be carried out as described in the particular case of the already mentioned U.S. Pat. No. 5,285,235.

In U.S. patent application Ser. No. 09/384,221 (corresponding to European Patent Application No. 98 116 162.3), the disclosure of which is hereby incorporated by reference in its entirety, there is described a situation typical for the photo finishing practice. A developed photographic film is unwound from a roll, sequentially guided through a photoelectric scanning device (film scanner) and a notching device, and finally rolled up again on a roll. The scanning device and the notching device are mechanically decoupled by means of dynamic loops. As a result of this mechanical decoupling, the individual image locations of the film need to be positioned independently of each other both in the scanning device and in the notching device.

SUMMARY OF THE INVENTION

Based on the prior art, it is an object of the present invention to simplify the photoelectric scanning photographic image acquisition (e.g. of a photographic medium, such as photographic film) and the provision of positioning notches, and in doing so, to particularly reduce the apparatus cost for the positioning of the mediums (e.g. films) or the images contained thereon.

In accordance with the invention, the film notching device is directly integral with the scanning device, so that the positioning of the films or the images contained thereon only needs to be carried out once. Thus, the required apparatus and the technical control needed for the positioning is substantially reduced when compared to separate scanning and notching devices. Furthermore, the scanning device in accordance with the invention requires substantially less room than two separate devices, which is particularly significant when arranging the device within a copier apparatus.

BRIEF DESCRIPTION OF THE DRAWINGS

The above objects and features of the present invention will be more apparent from the following description of the preferred embodiments with reference to the accompanying drawings, wherein.

DETAILED DESCRIPTION OF THE INVENTION

Figure 1:
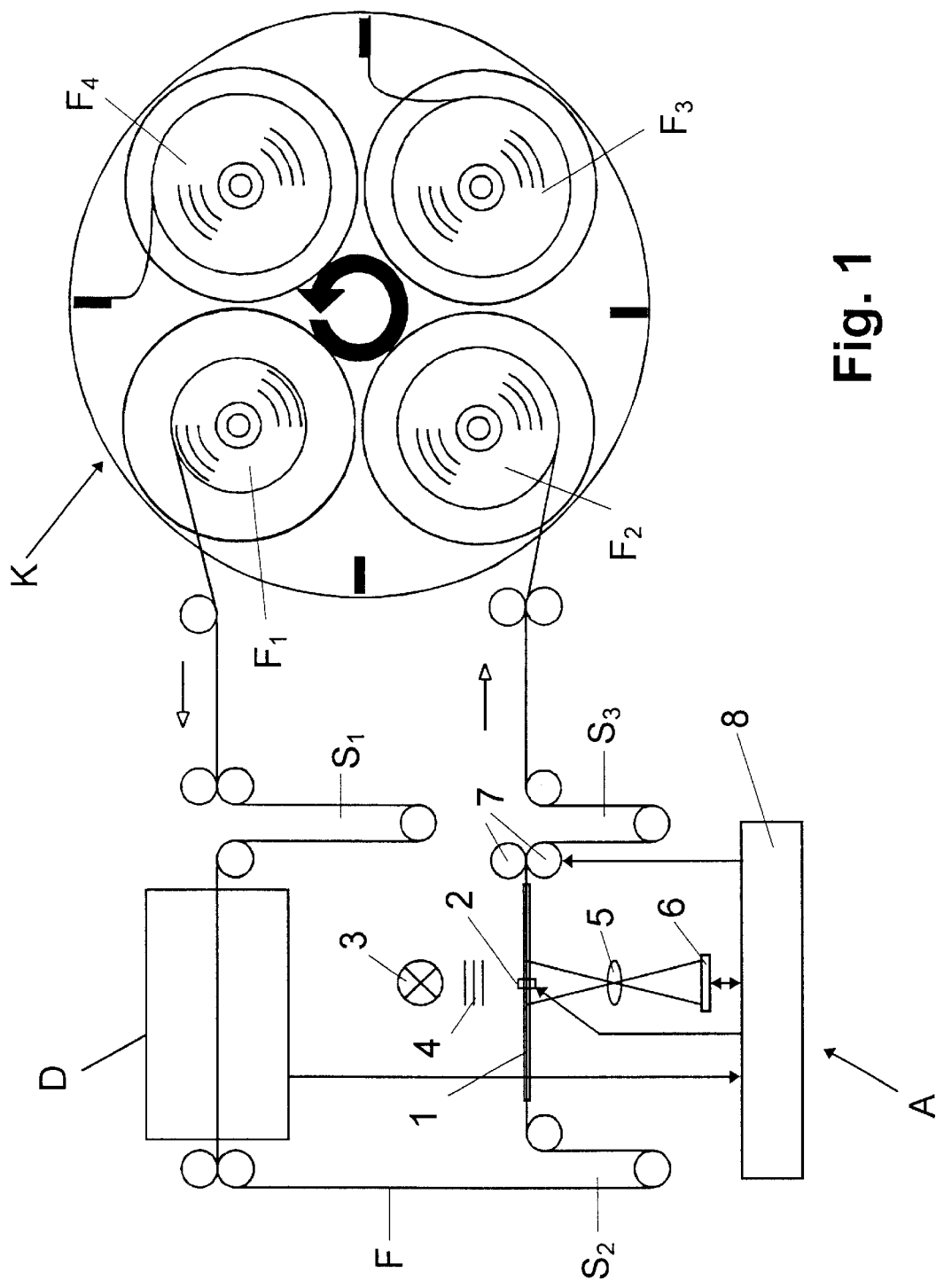
FIG. 1 shows an elementary sketch of an embodiment of the scanning device in accordance with the invention.

FIG. 1 presents the scanning device in accordance with the invention for a better understanding in the context of known components that are arranged before and after the scanning device. These components are a rotatable film carousel K having four film spools $F_1$–$F_4$ contained thereon, and an image location (frame) detector D. The film carousel K, the image location detector D, and the scanning device, denoted with A as a whole, are mutually mechanically decoupled to each other by means of three loop arrangements $S_1$–$S_3$. The film carousel K and the mechanical decoupling by means of loop arrangements $S_1$–$S_3$ are already described in all detail in the cited U.S. patent application Ser. No. 09/384,221 (corresponding to European Patent Application No. 98 116 162.3) and thus do not require any further explanation.

A film F to be scanned and notched or punched is unwound from the film spool $F_1$, sequentially passed through the image location detector D and the scanning device A and finally rolled up on film spool $F_2$. The image location detector D determines the relative positions of the individual original images (frames) on the film. The scanning device A utilizes this position information for the positioning of the individual original images. In particular, this can be carried out as in the already mentioned U.S. Pat. No. 5,285,235 so that the person of skill in the art does not require any further explanation.

The scanning device A itself includes a film platform 1 for the film to be scanned, a film notching device 2 which in accordance with the invention is arranged in or on the film platform 1, a source of white light 3, such as a halogen lamp, for example, a color shutter 4 which operates for example in a color sequential manner, an imaging optics 5, and a photoelectric converter 6, such as a two-dimensional field of CCD photodiodes. Furthermore, means for transporting the film F through the scanning device, symbolized by rollers 7, and an electronic member 8 for controlling all electrical and electronical components of the scanning device, particularly also for transporting and positioning the film F or the original images contained thereon, are provided.

The light emitted from the light source 3 passes through the color shutter 4 and is incident on the original images V to be scanned (FIG. 3) and contained on film F, which are positioned on the film platform 1. The original images V are imaged on the photoelectric converter 6 by means of the imaging optics 5. This converter locally resolves each original image V to be scanned into individual pixels and converts the intensity of the measuring light being emitted from each individual pixel of the original image into a corresponding electrical scanning signal. The original image V and thus also the photoelectric converter 6 are sequentially hit with measuring light of three or more different colors for a certain exposure duration as controlled by the color shutter 4, and the resulting scanning signals for each exposure are read out by the electronic member 8 after each exposure.

Thus far, the scanning device in accordance with the invention corresponds in structure and function to conventional sequential color scanning devices, so that a detailed explanation is not necessary to the person of skill in the art. The differences between the scanning device in accordance with the invention and prior art devices are simply the presence of the film notching device 2 and the resulting special structure of the film platform 1. The film notching device 2 and the film platform 1 are described in more detail in the following with respect to FIGS. 2–5.

Figure 2:
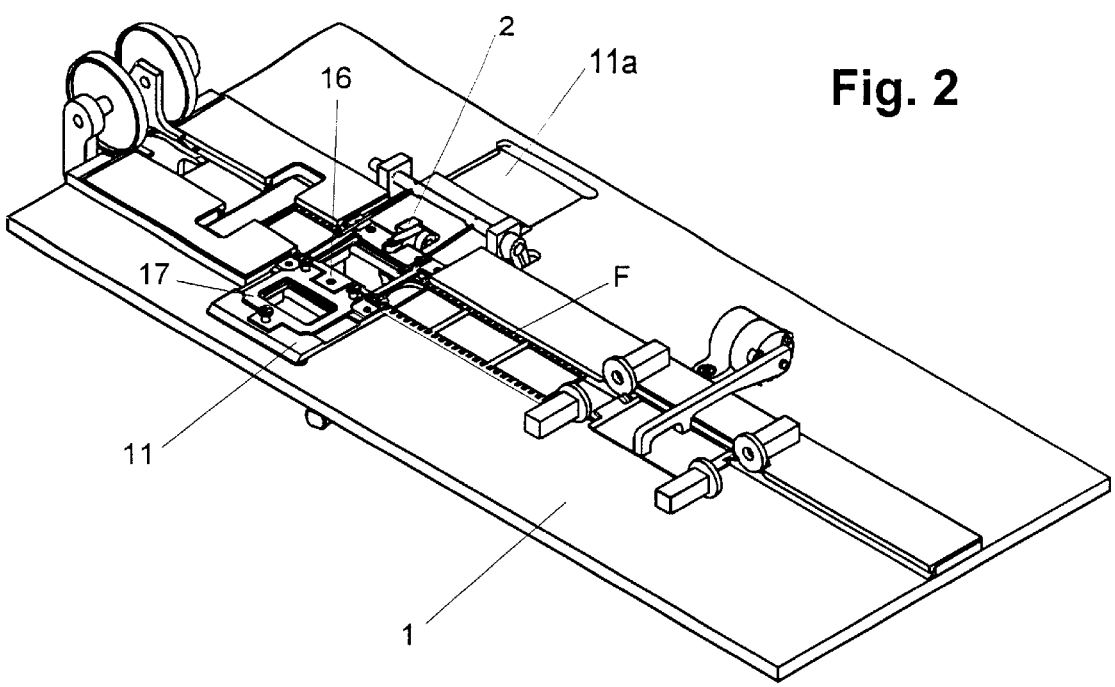
FIG. 2 shows an oblique view of the film platform of the scanning device of FIG. 1.
Figure 3:
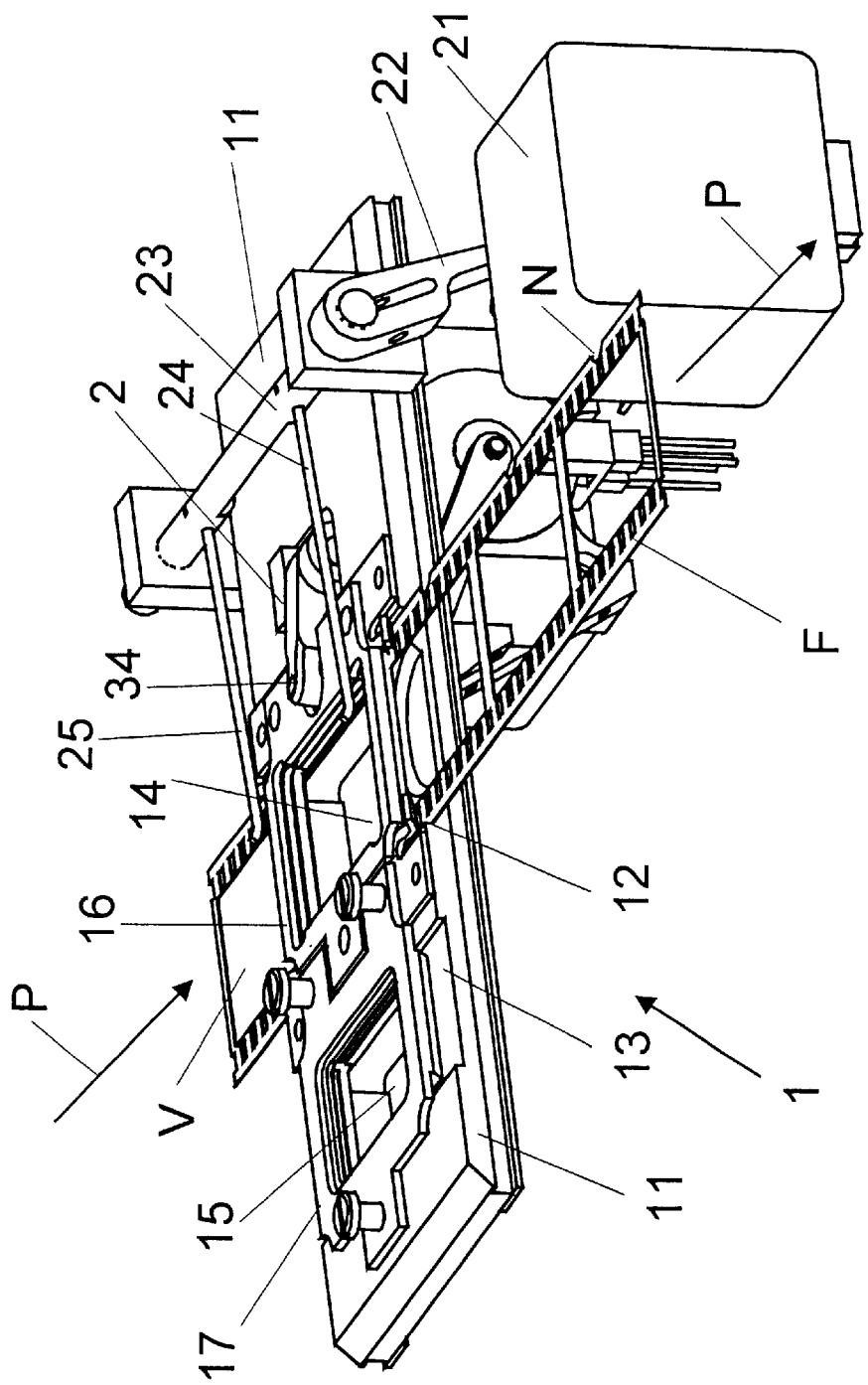
FIG. 3 shows an oblique view of the carriage of the film platform.
Figure 4:
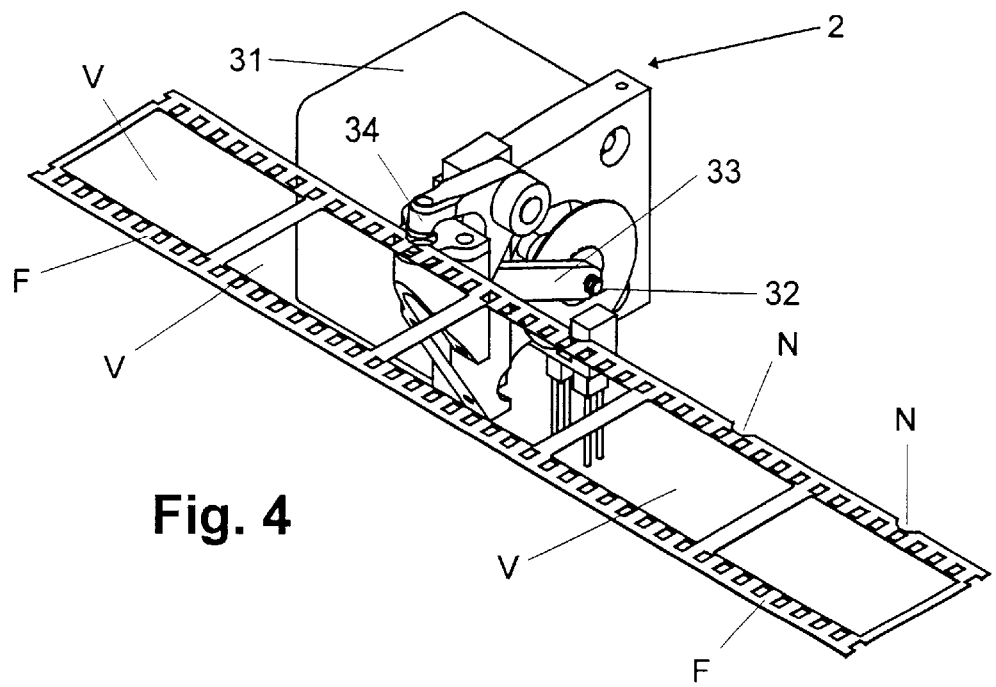
FIG. 4 shows an oblique view of the film notching device of the scanning device.
Figure 5:
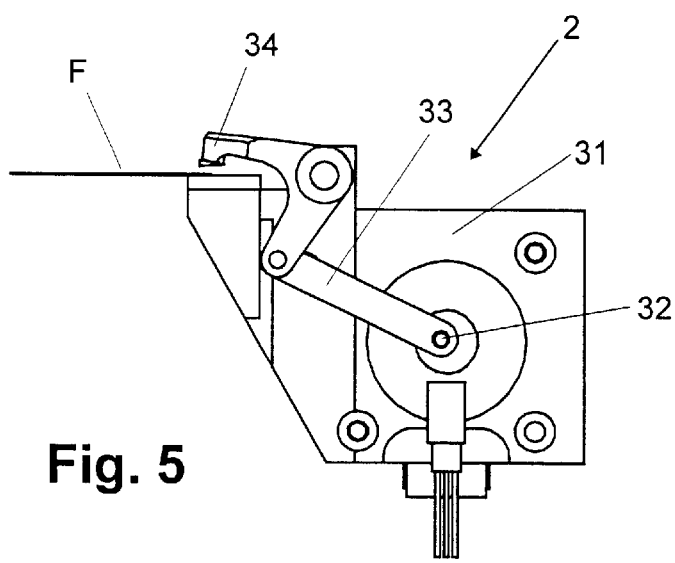
FIG. 5 shows a side view of the film notching device.

According to FIGS. 2 and 3, the film platform 1 includes a carriage 11 which is adjustably arranged in a guiding member 11a in the film platform 1 across the transport path P of the film F. The carriage 11 has two groove-like film guiding members 12 and 13 which are parallel to the transport path P and designed to fit differently wide film formats. Typically, the film guiding member 12 is adjusted to suit the 135 format and the film guiding member 13 is adjusted to suit the 24 mm format. By adjusting the carriage 11 either one or the other film guiding member 12 or 13 can be respectively inserted into the transport path P.

A scanning window 14 or 15 is provided in the region of both film guiding members 12 and 13, respectively. These scanning windows each determine a scanning position in which the original images V contained on film F are positioned.

A pressure mask 16 and 17 is arranged above each of the two scanning windows 14 and 15, respectively, on the carriage 11. The pressure masks 16 and 17 are adjusted to suit the format of the films guided in the respective film guiding members 12 and 13. The pressure masks 16 and 17 are movably arranged on the carriage 11 such that they can be moved back and forth on the carriage 11. The film that is guided in the respective film guiding member is locked in place by depressing a pressure mask against the carriage that lies underneath. An electrical drive that is arranged in a stationary manner, is provided in the film platform 1 for depressing the pressure masks, which electrical drive is, as commonly known, composed of an electrical motor 21, a drive crank 22 driven by the motor, a shaft 23 coupled with the drive crank, and two spring clips 24 and 25 that are fastened to the shaft and extend radially therefrom. The two spring clips 24 and 25 are in co-operation with the respective pressure mask being in the transport path at a certain time and press the respective pressure mask against the carriage that lies underneath depending on the rotary position of the drive crank 22 and thus of the shaft 23. The pressure mask can be lifted off for example by resiliently supporting the pressure mask or by resiliently designing the same, when the spring clips 24 and 25 are swivelled upwards again.

The film notching device 2 is arranged slightly to the side, just outside the scanning window 14 which is located close to the film transport path P. The notching device 2 is conventionally structured and basically includes a drive motor 31, a drive crank 32 driven by the motor, and a swivelable stamping member 34 coupled with the crank via a rod 33. The stamping or punching member 34 extends laterally into the marginal section of the film F and performs an upward and downward movement with each revolution of the drive motor 31, whereby a semicircular notch N is stamped out of the margin of the film F in a known manner. The details of the notching device 2 can be seen best in FIGS. 4 and 5.

In operation, the film F to be scanned is passed through the scanning device A step-by-step along the film transport path P, wherein each individual original image V contained on the film is positioned in the scanning window 14. The transport and the positioning is carried out in a known manner by means of motor driven transport rollers 7 which are controlled by the electronic member 8 based on the information provided by the image location detector D, wherein the image location detector D provides information about the position of the individual original images V on the film F. Once an original image V is correctly positioned and the film has come to a complete stop, the drive motors 21 and 31 are set in motion. The film is thereby locked on the carriage 11 by means of the pressure mask 16 and a notch is stamped out of the film margin. The photoelectric scanning of the original image V that is held in the scanning position is carried out after an adjustable short quieting phase. Subsequently, the pressure mask 16 is lifted off again and the stamping member 34 is moved upwards again and the film is transported until the next original image V reaches the scanning position, and so forth. If for some reason, a scanning is not supposed to be carried out, it is of course possible to only notch the film.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A photographic image acquisition device for original images contained on a photographic medium comprising:
   a medium platform for respectively temporarily holding the original images contained on the medium in a predefined acquisition position;
   a light source for illuminating an original image in the acquisition position;
   a detecting member for detecting light being transmitted through the respective original image in the acquisition position, and for converting the received light into electrical acquisition signals in a two-dimensional and pixel-by-pixel manner;
   a film transport path;
   an optical member for imaging the respective original image in the acquisition position onto the detecting member; and
   a medium notching device disposed at the medium platform in the region of the acquisition position for punching or stamping a positioning notch into the side margin of the medium in a location associated with the respective original image being in the acquisition position, wherein:
      said medium notching device is a film notching device and said medium platform is a film platform,
      the film platform further includes a film guiding member, a pressure mask associated with said film guiding member, and drive means for moving the pressure mask, said pressure mask being movably arranged in the region of the film guiding member such that the pressure mask is movable towards and away from the film platform, and
      said film is guided on the film platform in the scanning device along the film transport path, the film platform including a carriage which is adjustable transverse to the film transport path, said film guiding member and said pressure mask being arranged on the carriage, said carriage further including at least another film guiding member and at least another movable pressure mask for each one of the respective other film guiding members, wherein each of the respective film guiding members is insertable into the film transport path through an adjustment of the carriage transverse to the film transport path, and wherein the drive means are for driving the pressure mask which is associated with the respective film guiding member being in the film transport path.

2. A photographic image acquisition device of claim 1, wherein:
   the detecting member is a photoelectric converter for receiving light being transmitted through the respective original image in the acquisition position, wherein the acquisition position is a scanning position, and for converting the received light into electrical scanning signals in a two-dimensional and pixel-by-pixel manner; and
   an electronic member is provided for controlling the photoelectric converter and for reading out the electrical scanning signals which are generated by said photoelectric converter.

* * * * *